United States Patent [19]

Hiraiwa et al.

[11] Patent Number: 5,173,924
[45] Date of Patent: Dec. 22, 1992

[54] METHOD FOR EQUALIZING RECEIVED BURST SIGNAL

[75] Inventors: Hisaki Hiraiwa, Kanagawa; Mitsuhiro Suzuki, Tokyo; Takushi Kunihiro, Kanagawa, all of Japan

[73] Assignee: Sony Corporation, Tokyo, Japan

[21] Appl. No.: 700,424

[22] Filed: May 15, 1991

[30] Foreign Application Priority Data

May 21, 1990 [JP] Japan .................................. 2-130752
May 21, 1990 [JP] Japan .................................. 2-130753

[51] Int. Cl.$^5$ ........................................... H03H 7/30
[52] U.S. Cl. ....................................... 375/12; 375/118; 375/14
[58] Field of Search ................ 375/11, 12, 14, 118, 375/103, 86; 333/18; 364/724.2

[56] References Cited

U.S. PATENT DOCUMENTS 4,071,827  1/1978  Koike et al. ............................ 375/12
4,953,186  8/1990  Levy et al. ............................ 375/118

FOREIGN PATENT DOCUMENTS 0322542  11/1988  European Pat. Off. .
3627677   2/1988  Fed. Rep. of Germany .

OTHER PUBLICATIONS

Annex to European Search Report.

Primary Examiner—Curtis Kuntz
Assistant Examiner—Tesfaldet Bocure
Attorney, Agent, or Firm—Ronald P. Kananen

[57] ABSTRACT

The present invention relates to an equalizing system in which an input signal is supplied to a series circuit of a plurality of delay means, the input signal and delayed output signals of the respective delay means are multiplied with coefficients and multiplied outputs are added to thereby produce an equalized output signal. In this equalizing system, the input signal is supplied to the series circuit of the plurality of delay means so that the input signal is transmitted in the positive direction within the series circuit so as to be sequentially delayed, the input signal is then transmitted in the reverse direction within the series circuit so as to be sequentially delayed, the input signal is transmitted again in the positive direction within the series circuit so as to be sequentially delayed, an amplitude error of the output equalized signal is detected, and coefficients multiplied with the delayed output signals of the respective delay means are calculated in response to the detected amplitude error so that the amplitude error is minimized.

6 Claims, 5 Drawing Sheets

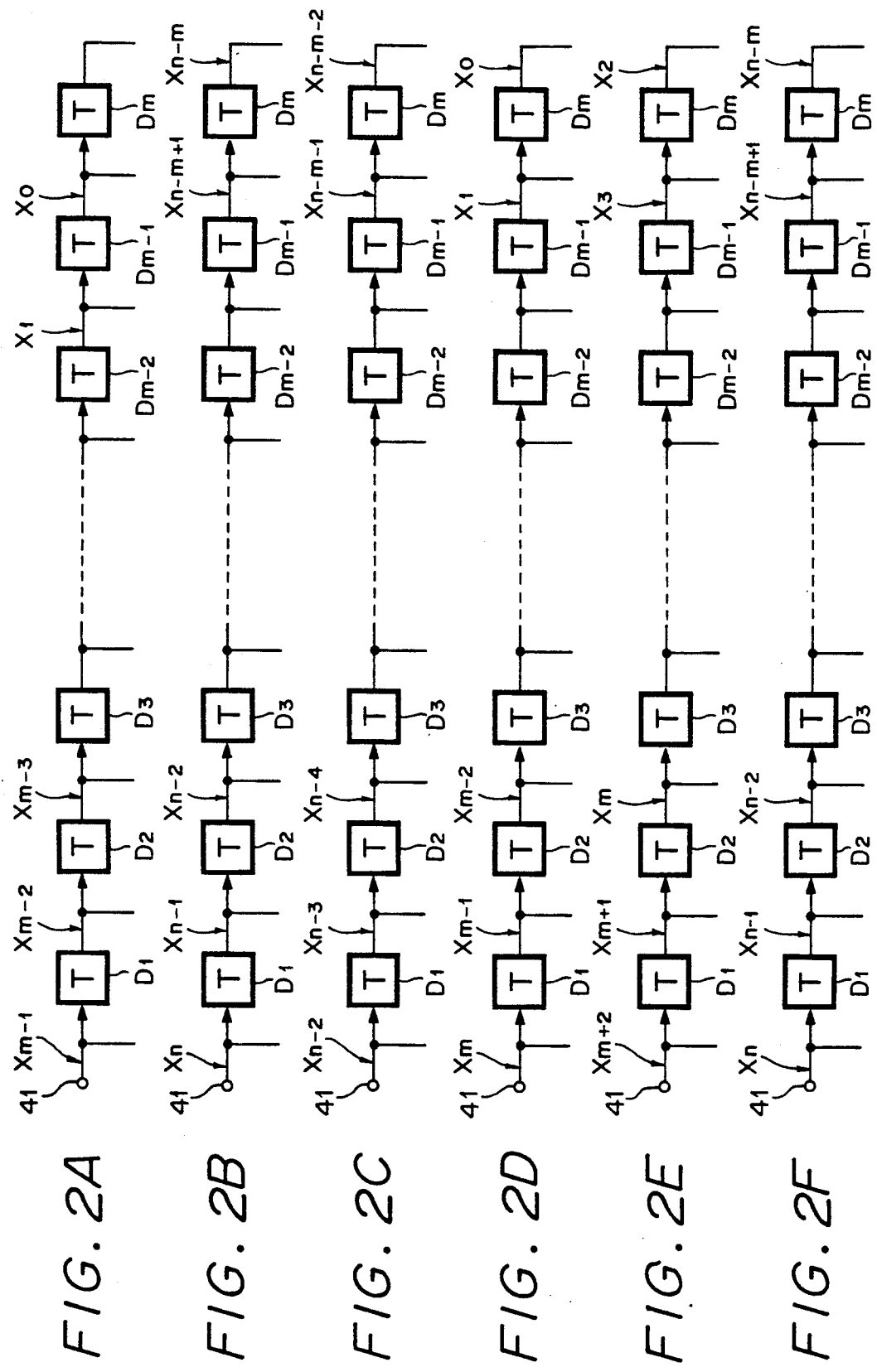

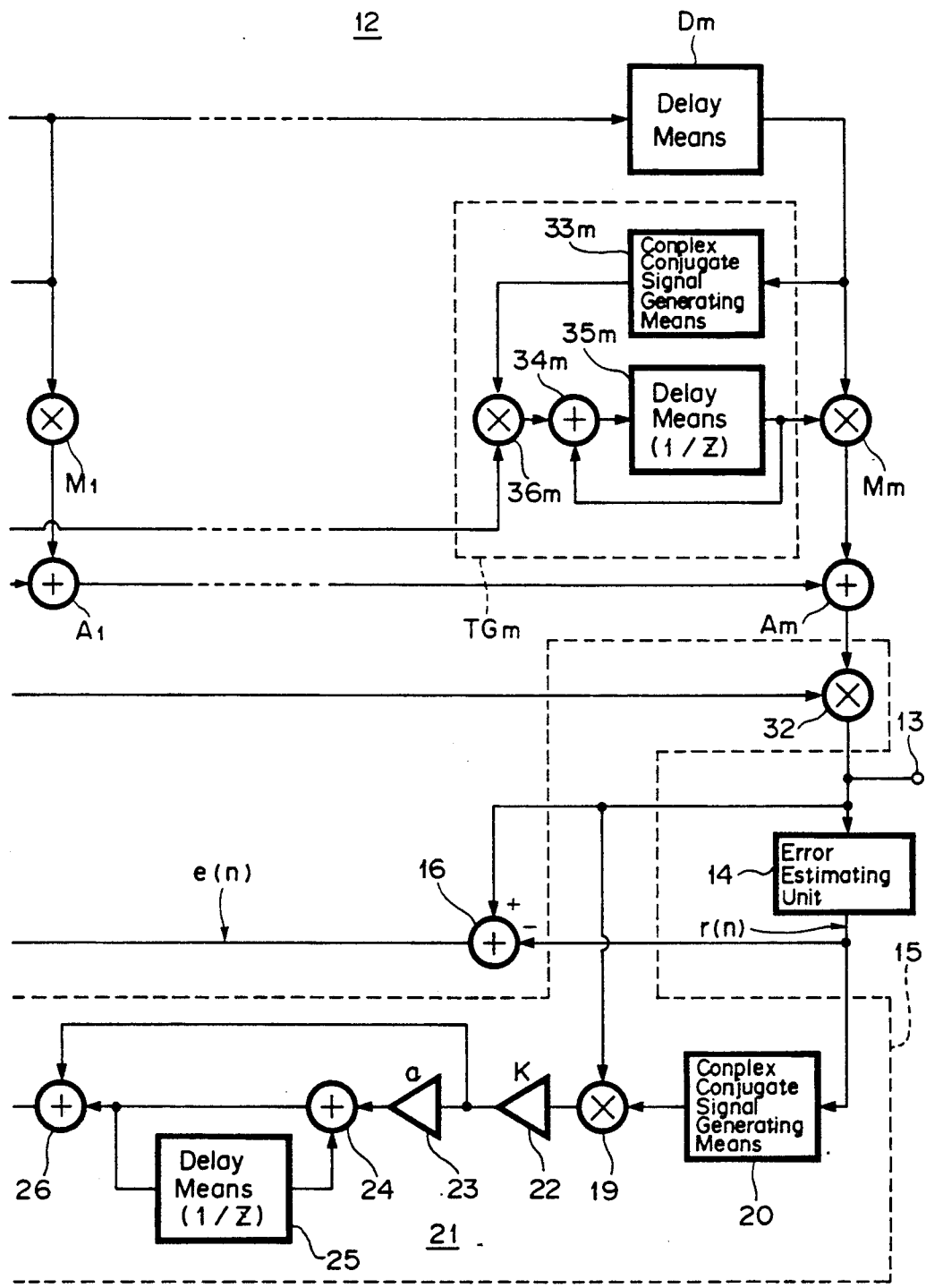

FIG. 4
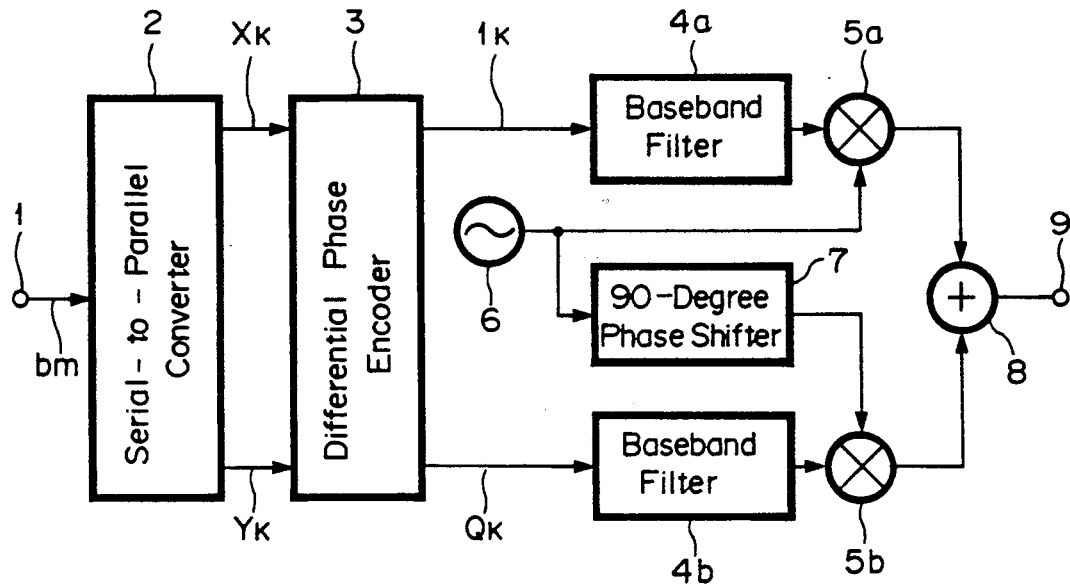
FIG. 5 I
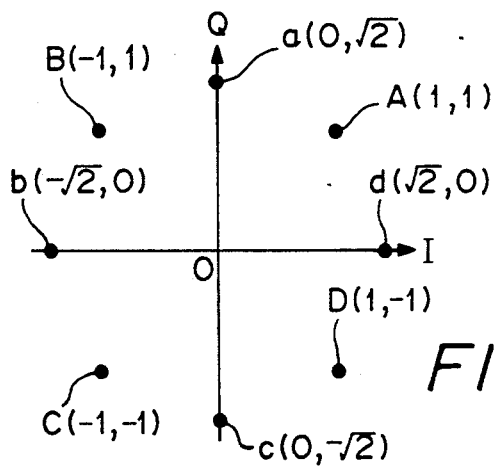
FIG. 5 II
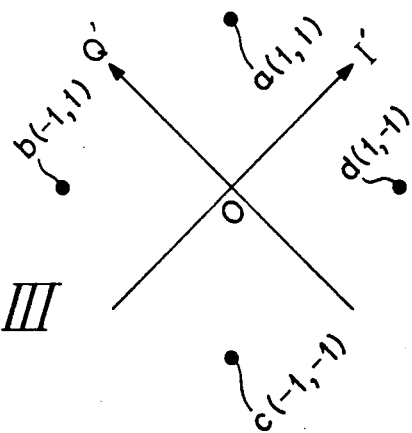
FIG. 5 III
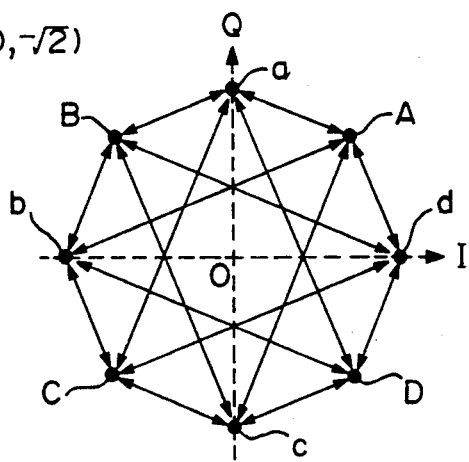

METHOD FOR EQUALIZING RECEIVED BURST SIGNAL

BACKGROUND OF THE INVENTION

1. Field of the Invention

The present invention generally relates to a method for equalizing a received burst signal and, more particularly, is directed to an equalizing system suitable for demodulating a transmitted signal.

2. Description of the Prior Art

A TDMA (time division multiple access) system is known as one type of digital cellular communication system in which a base station and a mobile station are connected via radio waves. According to this TDMA system, six receiving slots, for example, are provided for every channel of the 900 MHz band and in each mobile station an incoming signal in one of the six slots is received for a period of 20 milliseconds at intervals of 120 milliseconds. Six transmission slots are similarly provided for every channel, and in each mobile station an outgoing signal in one of the six transmission slots is similarly transmitted. A reference receiving carrier frequency and a reference transmitting carrier frequency in a single mobile station are different from each other.

When a received signal is equalized by an equalizing apparatus in the base station or mobile station, the received signal is a burst signal which is received for a very short period of time (20 milliseconds) so that the tap convergence of the equalizing filter cannot be made sufficient. There is then the risk that the signal portion corresponding to the original signal portion of the received signal will be dropped out.

Furthermore, although it is proposed that the high speed convergence of the tap is effected by utilizing a nonlinear algorithm based on the feedback loop, there is then the disadvantage that the filter becomes unstable.

OBJECTS AND SUMMARY OF THE INVENTION

Accordingly, it is an object of the present invention to provide a method for equalizing a received burst signal in which the aforenoted shortcomings and disadvantages of the prior art can be eliminated.

More specifically, it is an object of the present invention to provide an equalizing system in which an amplitude error of an output equalized signal can be corrected.

It is another object of the present invention to provide an equalizing system in which an amplitude error of an output equalized signal and a phase error of carriers of the input signal and the equalized output signal can be corrected simultaneously to thereby increase an equalizing speed.

It is a further object of the present invention to provide an equalizing system in which, even if the input signal is received for a short period of time or even if the input signal has no preamble area, there is then no risk that the signal portion corresponding to the original signal portion of the input signal is dropped out.

As a first aspect of the present invention, an equalizing system is provided, in which an input signal is supplied to a series circuit of a plurality of delay means, the input signal and delayed output signals of the respective delay means are multiplied with coefficients and multiplied outputs are added to thereby produce an equalized output. This equalizing system is comprised of the steps of supplying the input signal to the series circuit of the plurality of delay means, in which the input signal is transmitted in the positive direction within the series circuit, thereby being delayed sequentially, transmitting the input signal in the reverse direction within the series circuit so that the input signal is sequentially delayed, transmitting again the input signal in the positive direction within the series circuit so that the input signal is sequentially delayed, detecting an amplitude error of the equalized output signal, and determining coefficients multiplied with the input signal and the delayed output signals of the respective delay means in response to the detected amplitude error such that the amplitude error is minimized.

In accordance with a second aspect of the present invention, an equalizing system is provided, in which an input signal is supplied to a series circuit of a plurality of delay means, the input signal and delayed output signals of the respective delay means are multiplied with coefficients and multiplied outputs are added to thereby produce an equalized output. This equalizing system is comprised of the steps of supplying the input signal to the series circuit of the plurality of delay means, in which the input signal is transmitted in the positive direction within the series circuit, thereby being delayed sequentially, transmitting the input signal in the reverse direction within the series circuit so that the input signal is sequentially delayed, transmitting again the input signal in the positive direction within the series circuit so that the input signal is sequentially delayed, detecting an amplitude error of the equalized output signal, determining coefficients to be multiplied with the input signal and the delayed output signals of the respective delay means in response to the detected amplitude error such that the amplitude error is minimized, synchronizing the equalized output signal in phase to thereby detect a phase error of a carrier, normalizing the input signal and the equalized output signal in response to the detected phase error, and marking a signal held by an integrating processing in a loop filtering processing of the phase-synchronizing processing with a positive or negative sign in response to the positive direction or reverse direction in which the input signal is transmitted within the series circuit.

The above and other objects, features, and advantages of the present invention will become apparent in the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 2A through 2F are schematic diagrams used to explain operation of the first embodiment of FIG. 1, respectively;

FIG. 4 is a block diagram showing a modulating circuit used in the present invention; and FIGS. 5I to 5III are respectively diagrams showing the encoding operation of the modulating circuit of FIG. 4.

DETAILED DESCRIPTION OF THE PREFERRED EMBODIMENTS

A first embodiment of the present invention will hereinafter be described with reference to FIG. 1. In this embodiment, the present invention is applied to a TDMA digital communication system in which the base station and the mobile station are connected via radio waves. Six receiving slots, for example, are provided for every channel of the 900 MHz band, and a mobile station receives an incoming signal in one slot thereof at intervals of 120 milliseconds for a period of 20 milliseconds. Six transmission slots are similarly provided for every channel, and a mobile station transmits an outgoing signal in one slot thereof with a similar time and interval. The reference receiving carrier frequency and the reference transmitting carrier frequency in a single mobile station are different from each other.

Figure 1:
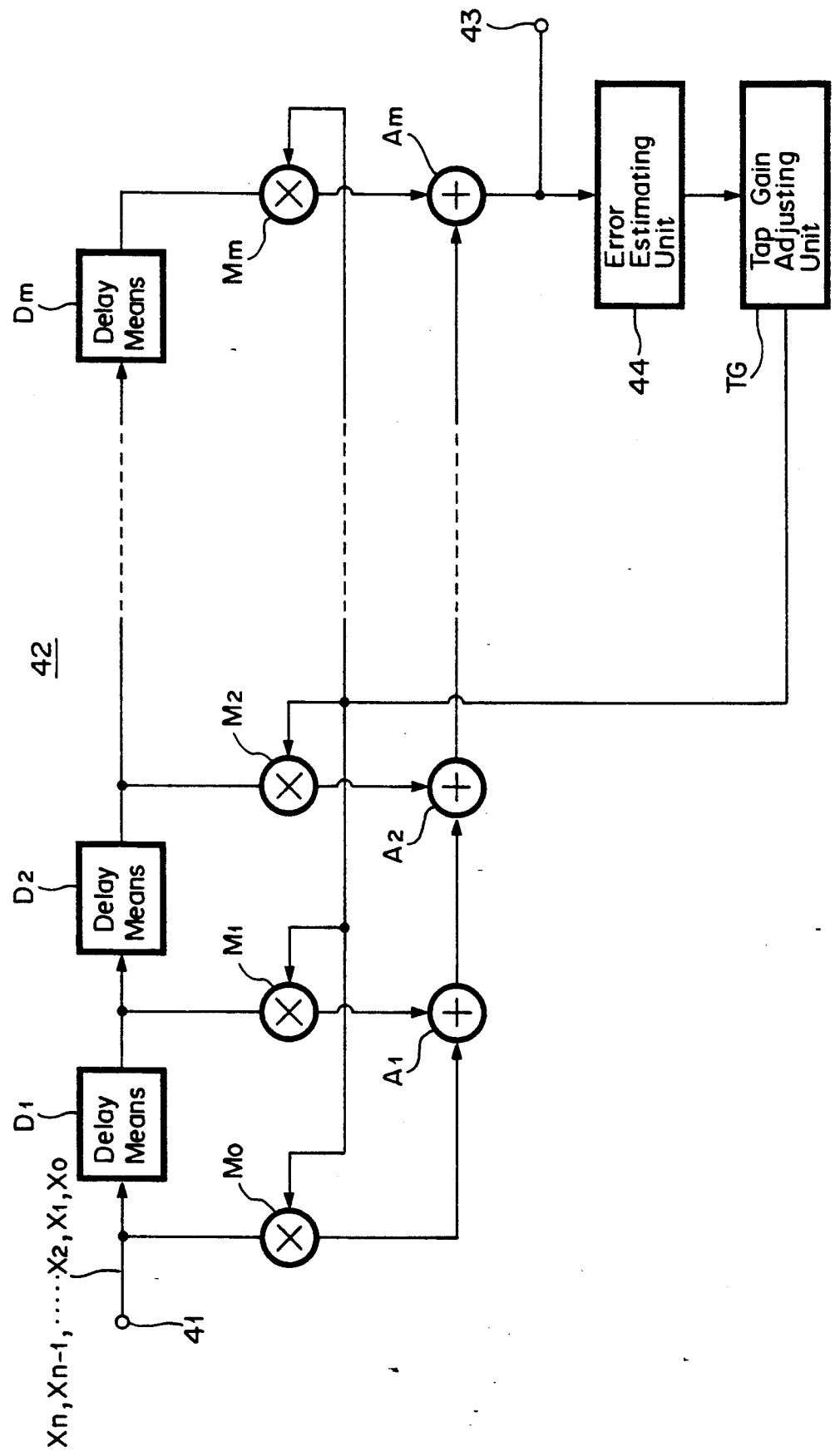
FIG. 1 is a block diagram showing a TDMA digital communication system to which a first embodiment of the present invention is applied.

FIG. 1 shows the signal processing, or operation processing based on the firmware by using a digital signal processor in a transmitter and receiver of, for example, a mobile station (i.e., a mobile telephone) in the form of a block diagram. It is needless to say that such signal processing may be carried out by the hardware (a discrete circuit or an integrated circuit (IC)) shown in FIG. 1.

In FIG. 1, reference numeral 42 depicts an equalizing filter unit and reference numeral 41 refers to an input terminal thereof. The input terminal 41 is supplied with an input signal, which is a signal received by one slot for a period of 20 milliseconds, i.e., input data signal.

As shown in FIG. 1, the equalizing filter unit 42 is composed of a series circuit of delay means $D_1, D_2, \ldots, D_m$, each having a delay time equal to one sampling interval Ts of the input signal, coefficient multiplying means $M_0, M_1, \ldots M_m$ to which the input signal and delayed output signals of the delay means $D_1, D_2, \ldots, D_m$ are supplied and adding means $A_1, A_2, \ldots, A_m$ which sequentially add multiplied outputs of the coefficient multiplying means $M_0, M_1, \ldots, M_m$ in an accumulating fashion. An equalized output signal (an equalized output data signal) is obtained from the adding means $A_m$ and delivered from an output terminal 43.

The equalized output signal from the adding means Am is supplied to an error estimating unit 44, i.e., an error estimating means which then derives an estimated signal. The estimated signal from the error estimating unit 44 is supplied to a tap gain adjusting unit TG i.e., a tap gain adjusting means which then derives coefficient signals which are respectively supplied to the coefficient multiplying means $M_0, M_1, M_2, \ldots, M_m$.

Accordingly, the input signal is supplied to the series circuit of the plurality of delay means $D_1, D_2, \ldots, D_m$, in which it is transmitted in the positive direction within the series circuit and is thereby sequentially delayed. The input signal is then transmitted in the reverse direction within the series circuit and is thereby sequentially delayed. Thereafter, the input signal is transmitted in the positive direction within the series circuit and is thereby sequentially delayed. This operation will be more fully with reference to FIGS. 2A through 2F.

Let it be assumed that the input signal, that is, the received signal of one slot is formed of consecutive sampling signals $X_0, X_1, X_2, \ldots, X_n$ where n is the number larger than m.

Further, memory means of predetermined storage capacity are provided a the input terminal 41 side and the output side of the delay means $D_m$ of the final stage so as to store sampling signals derived from the respective ends of the series circuit of the delay means $D_1, D_2, \ldots, D_m$ of the sampling signals $X_0, X_1, X_2, \ldots, X_n$ constituting the input signal, though not shown.

Initially, the input signal is supplied to the input terminal 41 in the order of the sampling signals $X_0, X_1, X_2, \ldots, X_n$ so that, as shown in FIG. 2A, sampling signals $X_0, X_1, \ldots, X_{m-3}, X_{m-2}, X_{m-1}$ are respectively output at the output sides of the delay means $D_{m-1}, D_{m-2}, \ldots, D_2, D_1$ and the input terminal 41 at a certain time point. Finally, at the time point in which sampling signals $X_{n-m}, X_{n-m+1}, \ldots, X_{n-2}, X_{n-1}, X_n$ are respectively output at the output sides of the delay means $D_m, D_{m-1}, \ldots, D_2, D_1$ and the input terminal 41 as shown in FIG. 2B, the transmission directions of the sampling signals are reversed.

Then, at a certain succeeding time point, sampling signals $X_{n-m-2}, X_{n-m-1}, \ldots, X_{n-4}, X_{n-3}, X_{n-2}$ are respectively output at the output sides of the delay means $D_m, D_{m-1}, \ldots, D_2, D_1$ and the input terminal 41 as shown in FIG. 2C. As a consequence, at the time point in which sampling signals $X_0, X_1, \ldots, X_{m-2}, X_{m-1}, X_m$ are respectively output at the output sides of the delay means $D_m, D_{m-1}, \ldots, D_2, D_1$ and the input terminal 41 as shown in FIG. 2D, the transmission directions of the sampling signals are further reversed.

Accordingly, at a certain time point, sampling signals $X_2, X_3, \ldots, X_m, X_{m+1}, X_{m+2}$ are respectively output at the output sides of the delay means $D_m, D_{m-1}, \ldots, D_2, D_1$ and the input terminal 41 as shown in FIG. 2E. Finally, the equalizing processing is ended at the time point where sampling signals $X_{n-m}, X_{n-m+1}, \ldots, X_{n-2}, X_{n-1}$ are respectively output at the output sides of the delay means $D_m, D_{m-1}, \ldots, D_2, D_1$ and the input terminal 41 as shown in FIG. 2F.

In that event, while the equalizing processing is performed under the condition that the equalized output signal may not have a drop-out at its signal portion corresponding to the original signal portion of the input signal after the input signal is transmitted in the positive and reverse directions within the series circuit of the delay means $D_1, D_2, \ldots, D_{m-1}, D_m$, the input signal may be transmitted in the positive and reverse directions within the series circuit more than twice.

According to the present invention, as described above, there is provided the equalizing system in which the input signal is supplied to the series circuit of the plurality of delay means and the input signal and the delayed output signals of the respective delay means are multiplied with the coefficients and added to thereby obtain the equalized output signal. In accordance with this equalizing system, the input signal is supplied to the series circuit of the plurality of delay means and transmitted in the positive direction within the series circuit, thereby being delayed sequentially. Then, the input signal is transmitted in the reverse direction within the series circuit so as to be sequentially delayed. Thereafter, the input signal is transmitted in the positive direction within the series circuit and is thereby sequentially delayed. Also, the amplitude error of the output equalized signal is detected and the coefficients respectively multiplied with the input signal and the delayed output signals of the respective delay mean are operated in response to the detected amplitude error such that the amplitude error may become minimum. Therefore, the amplitude error of the output equalized signal can be corrected. Also, even if the input signal is received for a short period of time or even if the input signal has no preamble portion, there is then no risk that the occurrence of the drop-out of the signal portion corresponding to the original signal portion of the input signal can be avoided in the equalized output signal.

Figure 3A:
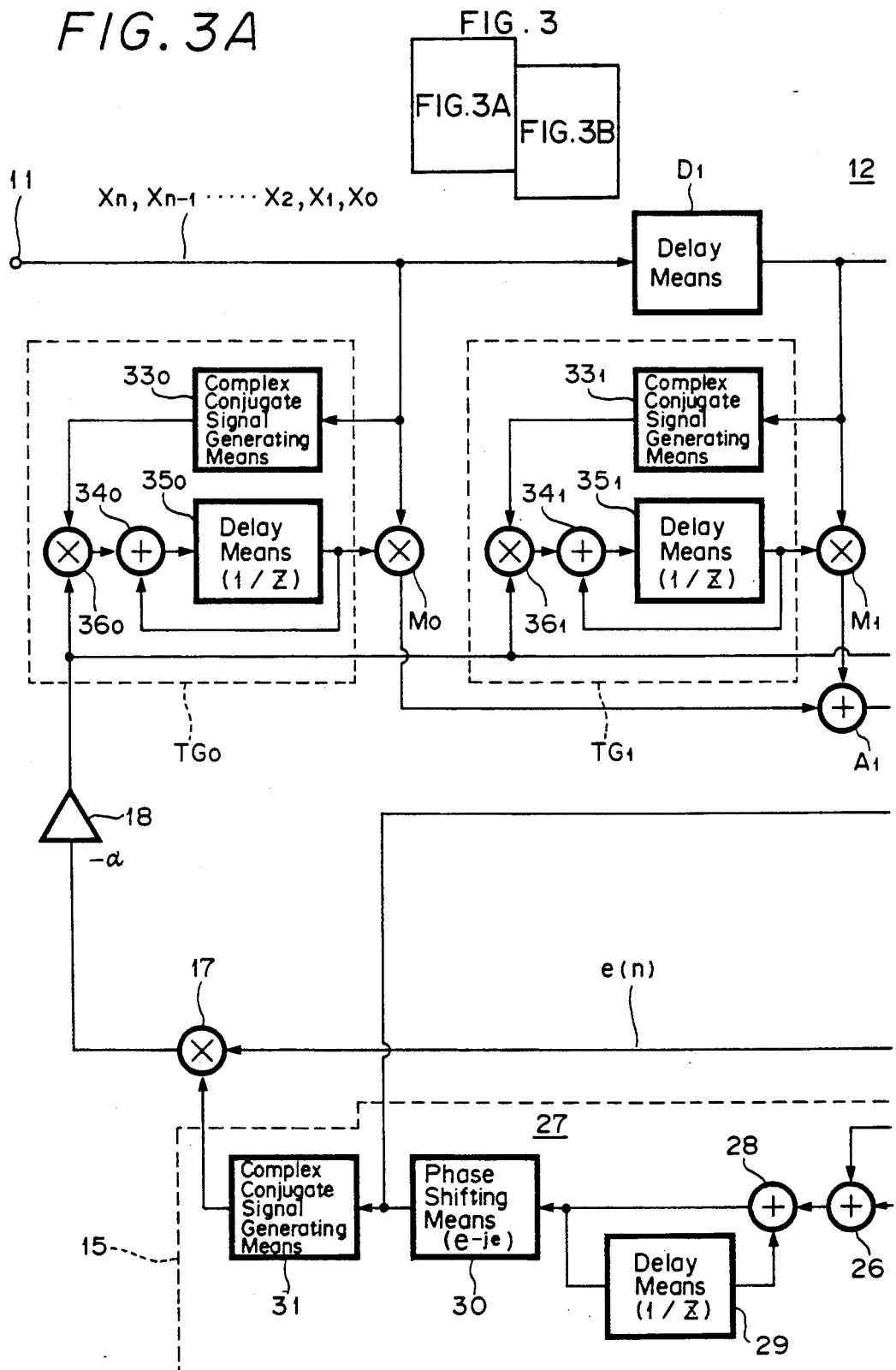
FIG. 3 (formed of FIGS. 3A and 3B) is a block diagram showing a second embodiment of the present invention.

FIG. 3 is a block diagram showing a second embodiment of the present invention. In this case, FIG. 3 is formed of FIGS. 3A and 3B drawn on two sheets of drawings so as to permit the use of suitably large scale.

In FIG. 3, reference numeral 12 designates an equalizing filter unit and reference numeral 11 refers to an input terminal thereof. The input terminal 11 is supplied with an input signal which is a signal received by one slot for a period of 20 milliseconds, i.e., an input data signal.

As shown in FIG. 3, the equalizing filter unit 12 is composed of a series circuit of delay means $D_1, D_2, \ldots, D_m$, each having a delay time equal to one sampling interval Ts of the input signal, coefficient multiplying means $M_0, M_1, \ldots M_m$ to which the input signal and delayed output signals of the delay means $D_1, D_2, \ldots, D_m$ are supplied, and adding means $A_1, A_2, \ldots, A_m$ which sequentially add multiplied outputs of the coefficient multiplying means $M_0, M_1, \ldots, M_m$ in an accumulating fashion. An output signal of the adding means Am is supplied to multiplying means 32 in a phase locked loop (PLL) 15 which will be described later. A multiplied output from the multiplying means 32 is delivered from an output terminal 13 and also supplied to an error estimating unit 14, i.e., an error estimating means 14 as an equalized output signal i.e., an equalized output data signal.

Tap gain adjusting means $TG_0, TG_1, TG_2, \ldots, TG_m$ are respectively provided for the coefficient multiplying means $M_0, M_1, \ldots, M_m$ to calculate and generate respective coefficients of the coefficient multiplying means $M_0, M_1, \ldots, M_m$ in response to the amplitude error of the output equalized signal such that the amplitude error may be minimized.

These tap gain adjusting means $TG_0, TG_1, TG_2, \ldots, TG_m$ are similarly constructed and composed of complex conjugate signal generating means $33_0$ to $33_m$ which generate complex conjugate signals of the input signal and the delayed output signals of the delay means $D_1, D_2, \ldots, D_m$, multiplying means $36_0$ to $36_m$ which multiply the respective complex conjugate signals and an output signal of a coefficient multiplying means 18 which will be described later and integrating means formed of adding means $34_0$ to $34_m$ and delay means $35_0$ to $35_m$ each having a delay time of one sampling interval Ts, for integrating the output signals of the multiplying means $36_0$ to $36_m$. Outputs of the respective integrating means are supplied to the corresponding coefficient multiplying means $M_0, M_1, \ldots, M_m$ as coefficient signals.

In the following description, let us assume that m is represented by $2\mu$ in order to understand the present invention more clearly, where $\mu$ is $1, 2, 3, \ldots$ Accordingly, the number of the coefficient multiplying means $M_0, M_1, M_2, \ldots, M_m$ is represented by $2\mu+1$. Further, let it be assumed that $C_0, C_1, C_2, \ldots, C_m$ represent the coefficient signals supplied to the coefficient multiplying means $M_0, M_1, M_2, \ldots, M_m$, respectively.

Referring to FIG. 3, a reference signal r(n) is obtained from the error estimating unit 14 and supplied to adding means 16, and an output of the multiplying means 32 is supplied to the adding means 16, in which the reference signal r(n) is subtracted from the output of the multiplying means 32 to provide an estimated error signal e(n). The estimated error signal is expressed by the following equation.

$$e(n) = \sum_{k=-\mu}^{\mu} C_k X_{n-k} - r(n) \quad (1)$$

Assuming that D represents a mean square error, then this is downwardly convexed with respect to Cj. Therefore, $\partial D/\partial Cj = 0$ must be satisfied in order to minimize the mean square error D. $\partial D/\partial Cj$ is expressed by the following equation.

$$\partial D/\partial Cj = E[X_{n-j} e(n)] \quad (2)$$

where E [ ] is the ensemble mean. One of the methods of solving the equation (2) is given by the following equation.

$$\begin{aligned} Cj(n+1) &= Cj(n) - \alpha(\partial D/\partial Cj) \\ &= Cj(n) - \alpha E[X_{n-j} \cdot e(n)] \end{aligned} \quad (3)$$

where Cj(n) is the value of Cj in the equality of $t = nT$ and $\alpha$ is the positive number sufficiently smaller than 1. This method is what might be called a gradient method. Assuming that the ensemble mean on the second term of the right side of the equation (3) represents the average of data at that time point, then the following equation is established.

$$E[X_{n-j} \cdot e(n)] = \frac{1}{K} \sum_{k=n-K+1}^{n} X_{k-j} \cdot e(n) \quad (4)$$

Thus, the equation (3) is expressed by the following equations.

$$Cj(n+1) = Cj(n) - \alpha X_{n-j} e(n) \quad (5)$$

$$1 \leq K = 2\mu + 1 \quad (6)$$

The circuit arrangement of the PLL 15, i.e., phase synchronization processing means, will be described below.

As shown in FIG. 3, the PLL 15 is composed of a loop filter 21 i.e., a loop filtering means, a voltage controlled oscillator (VCO) 27 i.e., a voltage controlled-type oscillating means or the like.

The equalized output signal from the adding means Am is supplied to the multiplying means 32, and an output of the multiplying means 32 is supplied to the multiplying means 19. The reference signal r(n) from the error estimating unit 14 is supplied through the complex conjugate signal generating means 20 to the multiplying means 19, in which it is multiplied with the equalized output signal. Then, a multiplied output from the multiplying means 19, that is, a phase error signal is supplied to a means 22 of the loop filter 21.

The loop filter 21 is composed of the means 22, means 23, adding means 24 to which an output of the means 23 is supplied, integrating means formed of delay means 25 having a delay time of one sampling interval Ts and to which the output of the adding means 24 is supplied and whose output is supplied to the adding means 24, and adding means 26 which adds the output of the means 22 and the output of the adding means 24. Incidentally, the means 22 is formed of a cascade connection means of multiplying means for multiplying the input signal with a coefficient K and multiplying means for multiplying the input signal with the sampling interval Ts. Similarly, the means 23 is formed of a cascade connection means of multiplying means for multiplying the input signal with a coefficient a (a=K/2) and multiplying means for multiplying the input signal with the sampling interval Ts. An output of the adding means 26 is supplied to adding means 28 in the VCO 27.

The VCO 27 is composed of the adding means 28, delay means 29 having a delay time of one sampling interval Ts to which an output of the adding means 28 is supplied and whose output is supplied to the adding means 28, phase-shifting means 30 to which the output of the adding means 28 is supplied and complex conjugate signal generating means 31 to which an output of the phase-shifting means 30 is supplied.

The output of the phase-shifting means 30 is supplied to the multiplying means 32, in which it is multiplied with the output of the adding means Am. Also, an output of the complex conjugate signal generating means 31 is supplied to the multiplying means 17, in which it is multiplied with the error signal e(n) from the adding means 16. An output from the multiplying means 17 is supplied through coefficient multiplying means 18, which multiplies an input signal with a coefficient $-\alpha$, to the multiplying means 32 of the above tap gain adjusting means $TG_0$, $TG_1$, ..., $TG_m$, respectively.

Thus, the input signal is supplied to the series circuit of the plurality of delay means $D_1$, $D_2$, ..., $D_m$ and transmitted in the positive direction within the series circuit, thereby being delayed sequentially. Then, the input signal is transmitted in the reverse direction within the series circuit and is thereby sequentially delayed. Thereafter, the input signal is transmitted in the positive direction within the series circuit and is thereby delayed sequentially. This operation is the same as the operation which was described earlier with reference to FIG. 2.

Furthermore, in this embodiment, the signal held by the integrating means of the loop filter 21 in the PLL 15 is marked with a positive or negative sign in response to the positive or reverse direction in which the input signal from the input terminal 11 is transmitted within the series circuit of the delay means $D_1$, $D_2$, ..., $D_m$ so as to be delayed sequentially.

Also in the above embodiment, while the equalizing processing is performed under the condition that the equalized output signal may not have a drop-out at its signal portion corresponding to the original signal portion of the input signal after the input signal is transmitted in the positive and reverse directions within the series circuit of the delay means $D_1$, $D_2$, ..., $D_{m-1}$, $D_m$, the input signal may be transmitted in the positive and reverse directions within the series circuit more than twice.

This embodiment uses a $\pi/4$ shifted QPSK (quadrature phase shift keying) modulation circuit which is shown in FIG. 4. However, the present invention is not limited to the above modulating circuit and can be applied to either an analog communication system or a digital communication system.

As shown in FIG. 4, a serial digital audio signal bm from an input terminal 1 is supplied to a serial-to-parallel converter 2, where it is converted to parallel digital signals Xk and Yk of 2 bits and then supplied to a differential phase encoder 3.

The encoding of the differential phase encoder 3 will be described with reference to FIGS. 5I to 5III.

As shown in FIG. 5I, points A (1, 1), B (-1, 1), C (-1, -1) and D (1, -1) on the perpendicular I axis (real axis) and Q axis (imaginary axis) are determined. Then, as shown in FIG. 5II, points a (1, 1), b (-1, 1), c (-1, -1) and d (1, -1) on the perpendicular I' axis (real axis) and Q' axis (imaginary axis), which result from rotating the orthogonal I axis and Q axis coordinates by 45 degrees ($\pi/4$) degrees, are also determined.

When the I' axis and Q' axis coordinates are moved in parallel and superimposed on the I axis and Q axis coordinates so that their origins coincide with each other, the coordinates of the points a, b, c, and d on the I' axis and Q' axis are presented as a $(0, \sqrt{2})$, b $(-\sqrt{-2}, 0)$, c $(0, -\sqrt{-2})$ and d $(\sqrt{2}, 0)$.

The encoded outputs Ik and Qk of the encoder 3 are then moved from any one of the points A through D on the I axis and Q axis coordinates to any one of the points a through d in accordance with the outputs Xk and Yk of 2 bits from the serial-to-parallel converter circuit 2 and moved from any one of the points a to d to any one of the points A to D in response to the outputs Xk and Yk of 2 bits of the parallel-to-serial converter circuit 2. The movements between any one of the points A to D and any one of the points a to d are represented in FIG. 5III. Such movements never pass through the origin O.

The movements between any one of the points A to D on the I axis and Q axis coordinates and any one of the points a to d on the I' axis and Q' axis coordinates can be expressed by the change (difference) $\Delta\phi$ of the angles of straight lines connecting the respective points and the origin O.

Accordingly, a relation between the outputs Xk, Yk and the difference $\Delta\phi$ will be represented on the following truth table.

| Xk | Yk | ΔΦ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

Then, Ik and Qk are expressed by the following equations.

$$Ik = Ik_{-1} \cdot \cos[\Delta\phi(Xk, Yk)] - Qk_{-1} \cdot \sin[\Delta\phi(Xk, Yk)]$$

$$Qk = Qk_{-1} \cdot \sin[\Delta\phi(Xk, Yk)] + Qk_{-1} \cdot \cos[\Delta\phi(Xk, Yk)]$$

The encoded outputs Ik and Qk are respectively supplied through baseband filters 4a and 4b to modulators (multipliers) 5a and 5b, where a carrier from a carrier generator 6 and a carrier whose phase is shifted by 90 degrees from the former carrier by a 90 degree phase shifter 7 are modulated (multiplied) with the respective encoded outputs. The outputs are then added by an adder 8 and output from an output terminal 9 as a digital modulated signal.

According to the above embodiments, an equalizing system is provided, in which an input signal is supplied to a series circuit of a plurality of delay means, the input signal and delayed output signals of the respective delay means are multiplied with coefficients and multiplied outputs are added to thereby produce an equalized output. This equalizing system is comprised of the steps of supplying the input signal to the series circuit of the plurality of delay means, in which the input signal is transmitted in the positive direction within the series circuit, thereby being delayed sequentially, transmitting the input signal in the reverse direction within the series circuit so that the input signal is sequentially delayed, transmitting again the input signal in the positive direction within the series circuit so that the input signal is sequentially delayed, detecting an amplitude error of the equalized output signal, calculating coefficients multiplied with the input signal and the delayed output signals of the respective delay means in response to the detected amplitude error such that the amplitude error is minimized, synchronizing the equalized output signal in phase to thereby detect a phase error of a carrier, normalizing the input signal and the equalized output signal in response to the detected phase error, and marking a signal held by an integrating processing in a loop filtering processing of the phase-synchronizing processing with a positive or negative sign in response to the positive direction or reverse direction in which the input signal is transmitted within the series circuit so as to be sequentially delayed. Therefore, the amplitude error of the output equalized signal and the phase error of the carriers of the input signal and the equalized output signal can be corrected simultaneously to thereby increase the equalizing speed. Also, even if the input signal is received for a short period of time or even if the input signal has no preamble area, there is then no risk that the signal portion corresponding to the original signal portion of the input signal is dropped out.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims. 0

What is claimed is:

1. An equalizing system in which an input signal is supplied to a series circuit of a plurality of delay means, said input signal and delayed output signals of said respective delay means are multiplied with coefficients and multiplied outputs are added to thereby produce an equalized output, comprising the steps of:
   supplying said input signal to said series circuit of said plurality of delay means, in which said input signal is transmitted in the positive direction within said series circuit, thereby being delayed sequentially;
   transmitting said input signal in the reverse direction within said series circuit so that said input signal is sequentially delayed;
   transmitting again said input signal in the positive direction within said series circuit so that said input signal is sequentially delayed;
   detecting an amplitude error of said equalized output signal; and
   determining coefficients multiplied with said input signal and said delayed output signals of said respective delay means in response to the detected amplitude error such that said amplitude error is minimized.

2. An equalizing system according to claim 1, wherein said input signal is stored at signal input and output sides of said series circuit of said plurality of delay means.

3. An equalizing system according to claim 2, wherein said input signal is modulated in a $\pi/4$ shifted quadrature phase shift keying (QPSK) fashion.

4. An equalizing system in which an input signal is supplied to a series circuit of a plurality of delay means, said input signal and delayed output signals of said respective delay means are multiplied with coefficients and multiplied outputs are added to thereby produce an equalized output, comprising the steps of:
   supplying said input signal to said series circuit of said plurality of delay means, in which said input signal is transmitted in the positive direction within said series circuit, thereby being delayed sequentially;
   transmitting said input signal in the reverse direction within said series circuit so that said input signal is sequentially delayed;
   transmitting again said input signal in the positive direction within said series circuit so that said input signal is sequentially delayed;
   detecting an amplitude error of said equalized output signal;
   determining coefficients to be multiplied with said input signal and said delayed output signals of said respective delay means in response to the detected amplitude error such that said amplitude error is minimized;
   synchronizing said equalized output signal in phase to thereby detect a phase error of a carrier;
   normalizing said input signal and said equalized output signal in response to the detected phase error; and
   marking a signal held by an integrating processing in a loop filtering processing of said phase-synchronizing processing with a positive or negative sign in response to the positive direction or reverse direction in which said input signal is transmitted within said series circuit.

5. An equalizing system according to claim 4, wherein said input signal is stored at signal input and output sides of said series circuit of said plurality of delay means.

6. An equalizing system according to claim 4, wherein said input signal is modulated in a $\pi/4$ shifted quadrature phase shift keying (QPSK) fashion.

* * * * *